United States Patent

[11] 3,593,616

| [72] | Inventor | John Vaudrey Fox<br>Evesham, England |
|---|---|---|
| [21] | Appl. No. | 833,553 |
| [22] | Filed | June 16, 1969 |
| [45] | Patented | July 20, 1971 |
| [73] | Assignee | Bomford & Evershed Limited<br>Evesham, England |
| [32] | Priority | June 17, 1968 |
| [33] | | Great Britain |
| [31] | | 28,793/68 |

[54] HYDRAULIC SAFETY OR OVERLOAD RELEASE MECHANISM
4 Claims, 4 Drawing Figs.

[52] U.S. Cl. .................................................. 91/228,
91/416, 91/422
[51] Int. Cl. ..................................................... F01l 21/04,
F15b 15/17
[50] Field of Search .......................................... 91/401,
416, 422, 228

[56] References Cited
UNITED STATES PATENTS

| 250,103 | 11/1881 | Reynolds | 91/422 (X) |
| 413,631 | 10/1889 | Prosser | 91/422 |
| 1,001,340 | 8/1911 | Blauvelt | 91/422 (X) |
| 2,261,444 | 11/1941 | Neubert, Jr. | 91/401 (X) |
| 2,378,409 | 6/1945 | Joy | 91/422 (X) |

*Primary Examiner*—Allan D. Herrmann
*Attorney*—Watson, Cole, Grindle and Watson ABSTRACT: A hydraulic ram for use as a safety or overload device comprises a cylinder closed at one end, a piston within and movable along the cylinder with a piston rod projecting through a fluid seal or gland at the other end thereof, an inlet for pressure fluid into the gland end of the cylinder, a passageway for fluid connecting the two ends of the cylinder, a nonreturn valve in said passageway permitting substantially free flow from the gland end to the closed end and a pressure relief valve arranged to permit flow of fluid out of the closed end when the pressure in the closed end exceeds a predetermined value or a predetermined value above that in the gland end.

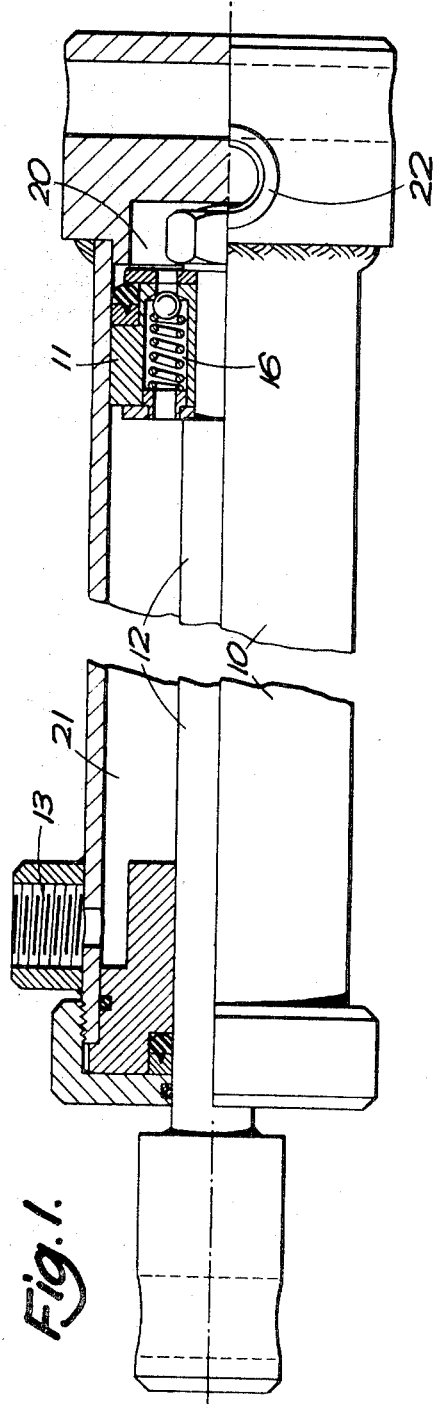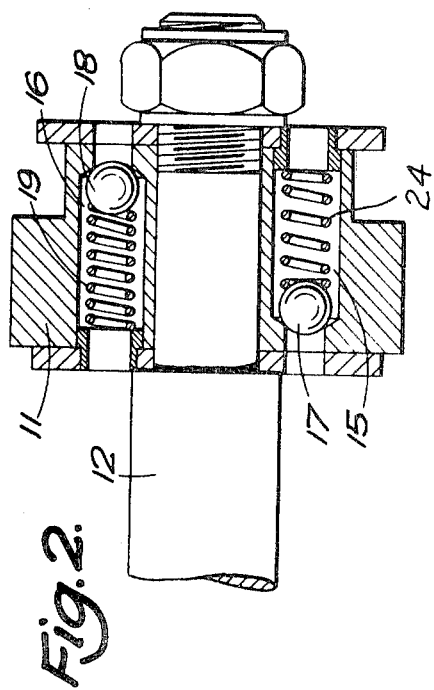

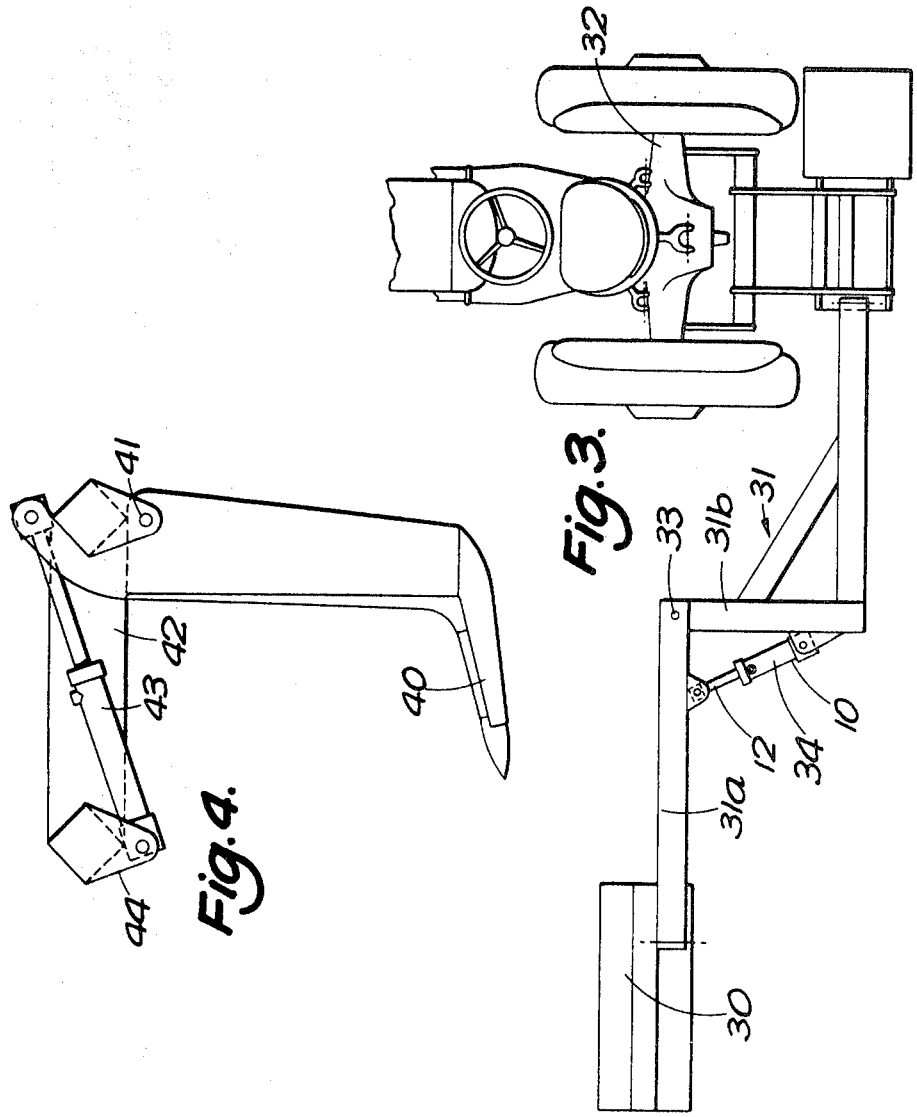

HYDRAULIC SAFETY OR OVERLOAD RELEASE MECHANISM

The invention relates to hydraulic safety or overload release mechanisms incorporating hydraulic rams and in particular to an arrangement in which the ram (e.g. acting as a strut) will permit a member to which it is attached to yield under excess load, subsequently returning it to its normal working position.

The invention provides a hydraulic ram comprising a cylinder closed at one end, a piston within and movable along the cylinder with a piston rod projecting through a fluid seal or gland at the other end thereof, an inlet for pressure fluid into the gland end of the cylinder, a passageway for fluid connecting the two ends of the cylinder, a nonreturn valve in said passageway permitting substantially free flow from the gland end to the closed end and a pressure relief valve arranged to permit flow of fluid out of the closed end when the pressure in the closed end exceeds a predetermined value or a predetermined value above that in the gland end.

Preferably the relief valve is in a passageway connecting the two ends of the cylinder so that the valve, when open, permits flow from the said closed end to said gland end.

It is further preferred that one or each passageway is in the piston extending through the piston head from one face to the other and the corresponding valve; or valves, is or are housed within the piston head.

A specific embodiment of the ram and some uses thereof, according to the invention will now be described by way of example and with reference to the accompanying drawings in which:

FIG. 1 is a half section, half elevation of the ram,

FIG. 2 is a section, through the piston,

FIG. 3 shows an application of the ram to a mowing machine, and

FIG. 4 shows an application of the ram to a subsoil share or mole plough.

Referring first to FIGS. 1 and 2, the ram comprises a cylinder 10 closed at one end and containing a piston 11 with a piston rod 12 passing out through a gland at the other end of the cylinder. There is an inlet 13 for hydraulic pressure fluid to the gland end of the cylinder. There are two passageways 15, 16 within the piston head leading from one face to the other and thus from one end of the cylinder to the other. The passage 15 contains a nonreturn valve 17 lightly loaded by a spring 24. This valve therefore permits substantially free flow of fluid from the gland end of the cylinder to the closed end, 20, of the cylinder. The passage 16 contains a pressure relief valve 18 controlled by a relatively stiff spring 19. This valve therefore permits return flow from the closed end 20 to the inlet or gland end, 21, when the pressure in the end 20 exceeds that in the inlet end 21 by a predetermined amount.

In use, pressure fluid enters through the inlet and fills the cylinder, both ends, air being released through a vent 22 which is subsequently closed. The fluid pressure in the two ends is substantially balanced by reason of the nonreturn valve but as the pressure in the end 20 acts on a larger piston area than that in the end 21, because of the presence of the piston rod, the piston moves to the left (Fig. 1) and the piston rod is projected from the cylinder. If now an external force is applied to the piston rod tending to return the rod into the cylinder, this force will be resisted by the fluid locked in the closed end 20 unless and until the force is sufficient to increase the fluid pressure in the end 20 above that in the end 21 to the value at which valve 18 opens. The rod will then move to the right into the cylinder. If the force then decreases sufficiently the piston will again move to the left.

FIG. 3 shows the application of the ram just described to a flail type mower. The mower comprises a cutting unit 30 carried by an arm 31 attached to the back of a tractor 32. The arm 31 is in two parts hinged together at 33 and the ram, shown at 34, serves as a strut holding the two parts against a stop, in the extended position shown. In the event that the resistance to forward movement of the unit 30 becomes excessive, the strut collapses thereby permitting the arm parts 31a to swing back and relieve the load. The two parts 31a, 31b of the arm are also hinged together about a horizontal fore and aft axis permitting the parts to be folded together when not in use.

FIG. 4 shows the use of the ram to support a mole plough or share 40 pivoted at 41 to a bracket or arm 42. The ram 43 connects an extension of the share to a fixed bracket 44 and permits the share to swing backwardly should it encounter excessive resistance to forward movement.

In the case of the mower, the flail unit is driven by a hydraulic motor supplied from a pump on the tractor and the lead to the ram is tapped off from the supply to the motor. In operation therefore the fluid pressure to the motor and hence also to the ram, will vary in proportion to the power requirement of the motor. The flails are driven in the reverse direction to the direction of travel and hence produce a drag or resistance to forward movement. The fluid pressure to the motor will be, roughly, proportional to this drag. Furthermore the force tending to extend the ram will be proportional to the fluid pressure and hence roughly proportional to the drag. The extending force is dependent on the diameter of the piston rod. The breakout force, controlled by the pressure difference between the two ends of the ram and the constants of the relief valve and piston head diameter will however be a constant amount greater than the extension force.

The invention is not restricted to the constructional details of the above examples. For instance the passageways and valves need not be in the piston head. They may be in external pipework or conduits connecting the two ends of a conventional double-acting ram. The ram may be used in conjunction with a rotary hydraulic motor as in FIG. 3 above or a linear motor or actuator, or may for example be connected in parallel with the hydraulic systems of agricultural-type tractors operating on well known principles, for instance constant pressure control or constant draft control. It can also be rendered entirely independent of any other hydraulic circuit by connecting it directly to a precharged hydraulic accumulator of suitable characteristics, or by incorporating such an accumulator within the gland end of the hydraulic cylinder.

I claim:

1. A yieldable structure comprising in combination a first member, a second member pivotally connected to said first member, a strut connecting together the first and second members at an angle to one another, said strut comprising a hydraulic ram having a cylinder closed at one end, a piston within and movable along the cylinder with a piston rod projecting through a fluid seal or gland at the other end of the cylinder, an inlet to said cylinder at the gland end, a passageway for fluid connecting the two ends of the cylinder and provided with a nonreturn valve permitting substantially free flow from the gland end to the closed end, a second passageway for fluid connecting the two ends of the cylinder and provided with a pressure release valve arranged to permit flow of fluid from the closed end to the open end when the pressure of the fluid in the closed end exceeds a predetermined value, or a predetermined value above that in the gland end, each valve having biassing means, the biassing means of the pressure release valve being greater than that of the nonreturn valve, and means to supply fluid under pressure to said inlet.

2. A yieldable structure according to claim 1 in which said passageways are provided in the piston and extend therethrough from one face to the other, the corresponding valves being provided in the piston head.

3. A yieldable structure according to claim 1 in which said one member carries working means including a hydraulic motor, the strut being operable by collapsing movement to reduce the head on the motor, said inlet being connected to the supply of pressurized fluid to the motor.

4. A yieldable structure according to claim 1, in which the inlet to the ram is connected to a source of pressure fluid at constant pressure.